(12) United States Patent
Cavagna

(10) Patent No.: US 10,197,012 B2
(45) Date of Patent: Feb. 5, 2019

(54) CARBURETOR FOR GASEOUS FUELS

(71) Applicant: BIGAS INTERNATIONAL AUTOGAS SYSTEMS S.r.l., Calenzano (FI) (IT)

(72) Inventor: Davide Cavagna, Calenzano (IT)

(73) Assignee: BIGAS INTERNATIONAL AUTOGAS SYSTEMS S.R.L., Calenzano (FI) (IT)

( * ) Notice: Subject to any disclaimer, the term of this patent is extended or adjusted under 35 U.S.C. 154(b) by 79 days.

(21) Appl. No.: 15/521,824

(22) PCT Filed: Oct. 28, 2015

(86) PCT No.: PCT/EP2015/075037
§ 371 (c)(1),
(2) Date: Apr. 25, 2017

(87) PCT Pub. No.: WO2016/066715
PCT Pub. Date: May 6, 2016

(65) Prior Publication Data
US 2017/0248102 A1 Aug. 31, 2017

(30) Foreign Application Priority Data
Oct. 28, 2014 (GB) .................................. 1419143.1

(51) Int. Cl.
*F02B 43/00* (2006.01)
*F02M 11/02* (2006.01)
(Continued)

(52) U.S. Cl.
CPC ............ *F02M 11/02* (2013.01); *F02M 17/04* (2013.01); *F02M 17/20* (2013.01); *F02M 19/02* (2013.01);
(Continued)

(58) Field of Classification Search
CPC ........ F02M 11/02; F02M 19/08; F02M 19/02; F02M 21/047; F02M 17/04; F02M 17/20; Y02T 10/32
See application file for complete search history.

(56) References Cited

U.S. PATENT DOCUMENTS

| | | | | |
|---|---|---|---|---|
| 4,020,810 A | * | 5/1977 | Baverstock | ........ F02M 21/0239 |
| | | | | 123/527 |
| 4,271,093 A | * | 6/1981 | Kobayashi | ............. F02M 17/04 |
| | | | | 123/179.11 |

(Continued)

FOREIGN PATENT DOCUMENTS

| | | |
|---|---|---|
| GB | 865413 A | 4/1961 |
| WO | 2011014149 A1 | 2/2011 |

*Primary Examiner* — Hung Q Nguyen
(74) *Attorney, Agent, or Firm* — Volpe and Koenig, P.C.

(57) ABSTRACT

A carburetor for supplying gaseous fuels in internal combustion engines, comprises a main body in which there are defined an intake section, a first pressure reduction section, a second pressure reduction section connected to the first section, a supply section connected to the second pressure reduction section, a Venturi device connected to the supply section, wherein the Venturi device forms a central portion of the carburetor, the first pressure reduction section and the supply section extending on opposite sides of the Venturi device, the second supply section being interposed between the first pressure reduction section and the supply section and wherein the supply section further comprises an actuating device that can to allow passage of gas through a third connecting conduit towards the third chamber.

7 Claims, 13 Drawing Sheets

(51) Int. Cl.
    *F02M 21/04*    (2006.01)
    *F02M 17/04*    (2006.01)
    *F02M 17/20*    (2006.01)
    *F02M 19/02*    (2006.01)
    *F02M 19/08*    (2006.01)

(52) U.S. Cl.
    CPC .......... *F02M 19/08* (2013.01); *F02M 21/047* (2013.01); *Y02T 10/32* (2013.01)

(56) References Cited

U.S. PATENT DOCUMENTS

| | | |
|---|---|---|
| 8,005,603 B2 | 8/2011 | Fisher et al. |
| 8,511,286 B2 | 8/2013 | Herzer et al. |
| 8,925,509 B2 * | 1/2015 | Warfel .................... F02M 1/02 |
| | | 123/179.11 |
| 2008/0236552 A1 | 10/2008 | Horikawa |
| 2012/0247435 A1 | 10/2012 | Veerathappa et al. |

* cited by examiner

A-A

B-B

D-D

E-E

A-A

CARBURETOR FOR GASEOUS FUELS

FIELD OF THE INVENTION

The invention relates to a carburetor of the type suitable for use with gaseous fuels, particularly LPG.

BACKGROUND

There are known carburetors intended for the supply of LPG or other types of gas to internal combustion engines.

For example, U.S. Pat. No. 8,511,286 describes a carburetors for an internal combustion engine supplied with gas, comprising a plurality of pressure reduction stages. In this way the gas, stored in liquid form in high-pressure containers, is brought to a pressure suitable for mixing with air by passing through the various stages.

Further examples of similar carburetor are described in U.S. Pat. No. 8,005,603 and U.S. 2012/0247435.

These carburetors, in particular, may be intended for the modification of engines originally designed to be supplied with petrol, or with liquid fuels in general.

In these cases, in order to modify the engine, the carburetor originally used, designed for supplying a petrol and air mixture, is replaced with a carburetor suitable for use with LPG or other gaseous fuel.

However, the known solutions have not proved to be particularly suitable for use in the modification of existing engines, because the LPG or other similar gaseous fuel is contained in pressurized containers, and pressure reduction stages must be provided to enable these solutions to be used in internal combustion engines.

Owing to the presence of these stages, and the need to provide adequate safety devices, the dimensions and overall volumes of these carburetor for LPG are such that they are difficult to adapt for use in existing engines.

Furthermore, the operating conditions in many applications are particularly exposed to dust and other types of contaminant, and in these cases the known carburetors for gaseous fuels are subject to malfunction or prove unsuitable in other ways.

The fundamental technical problem of the present invention is therefore to provide a carburetor for gaseous fuels whose structural and functional design is such that all the aforementioned difficulties of the cited prior art can be overcome.

This problem is resolved by a carburetor according to Claim 1.

Preferred characteristics of the invention are defined in the dependent claims.

The discovery on which the present invention is based enables internal combustion engines with carburetors supplied with petrol to be converted in a simple and effective way so that they can be supplied with gaseous fuels. Additionally, the carburetor according to the present invention has excellent characteristics of safety and reliability.

BRIEF DESCRIPTION OF THE DRAWINGS

The characteristics and further advantages of the invention will be more clearly apparent from the following detailed description of a preferred, but non-exclusive, example of embodiment of the invention, illustrated, for guidance and in a non-limiting way, with reference to the attached drawings, in which.

DETAILED DESCRIPTION OF THE PREFERRED EMBODIMENTS

Figure 1A:
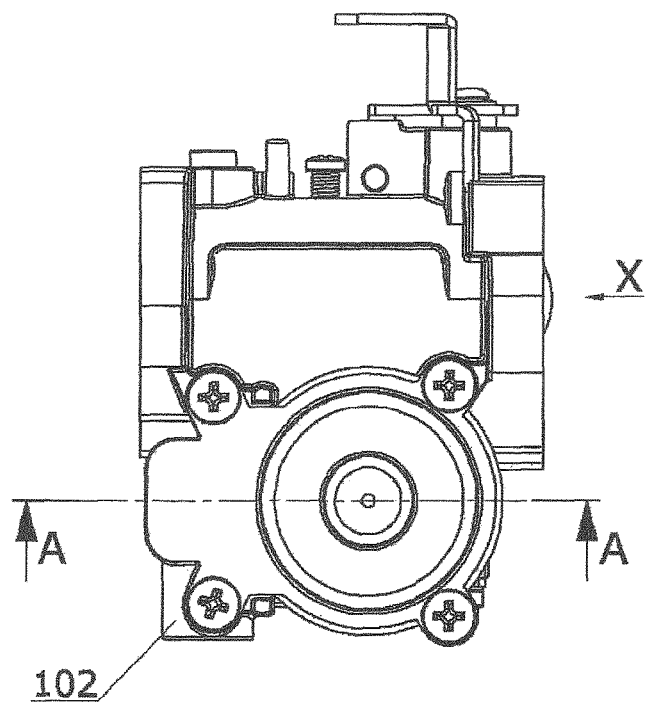
FIGS. 1A to 1E are, respectively, four side views and a top view of the carburetor according to the present invention.
Figure 1B:
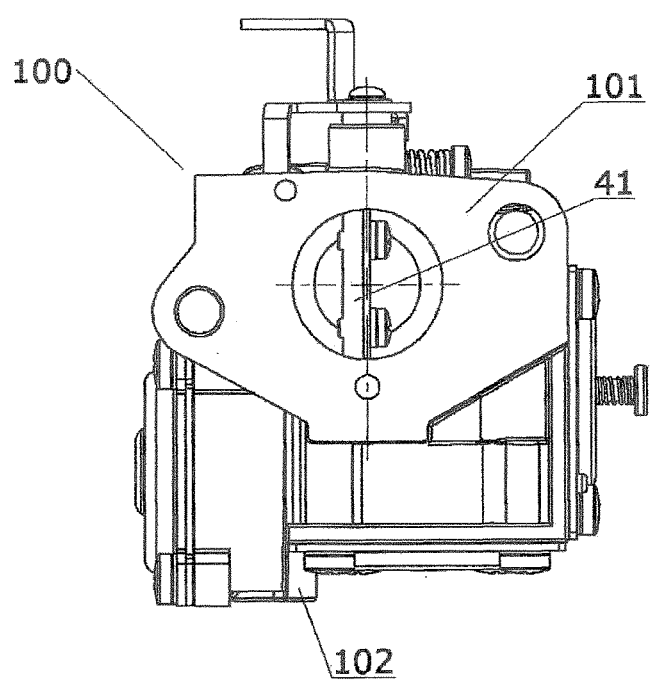
Figure 1C:
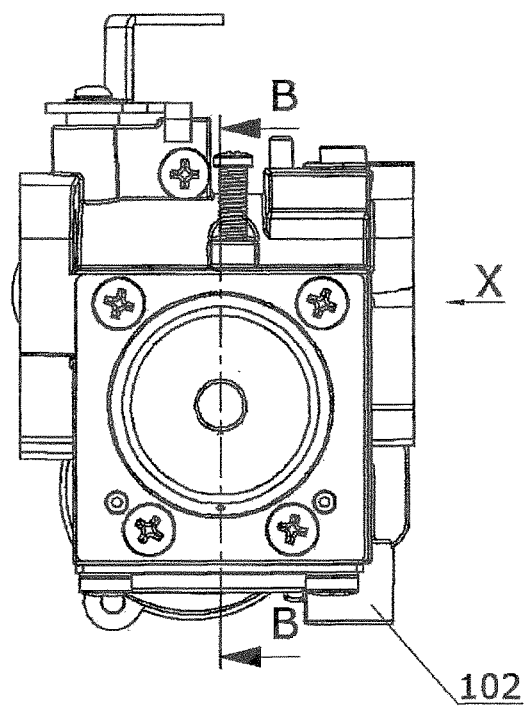
Figure 1D:
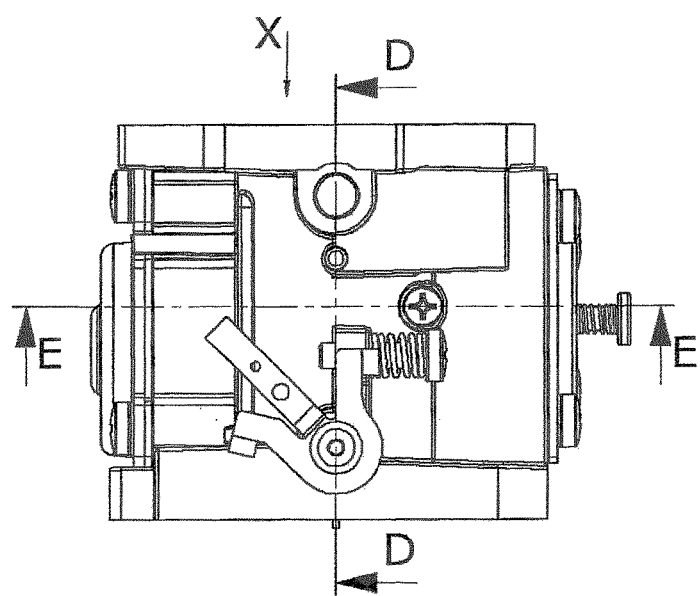
Figure 1E:
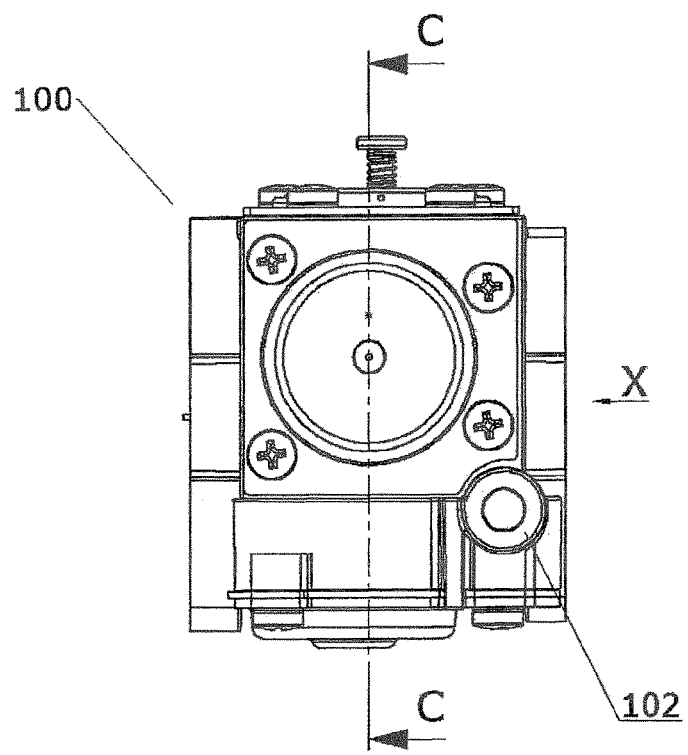

With initial reference to FIGS. 1A-1D, a carburetor for supplying gaseous fuels such as LPG in internal combustion engines is indicated as a whole by the reference numeral 100.

The carburetor 100 comprises a main body 101, made by a single casting process, for example. The carburetor 100 further comprises an intake section 102 for the fluid fuel at high pressure, which can be connected by a conduit, not shown in the figure, to a pressurized gas container (also not shown). The gas is typically stored at high pressure in the liquid state, and pressure reduction is therefore necessary to enable the gas to be used as a fuel in the engine.

Preferably, the connection between the pressurized gas container and the intake section 102 takes the form of a flexible tube (also not shown in the figure) which allows the pressurized container to be reached easily, particularly in cases where the carburetor 100 according to the present invention is used for the modification of existing engines without a special housing for the pressurized container.

Figure 2:
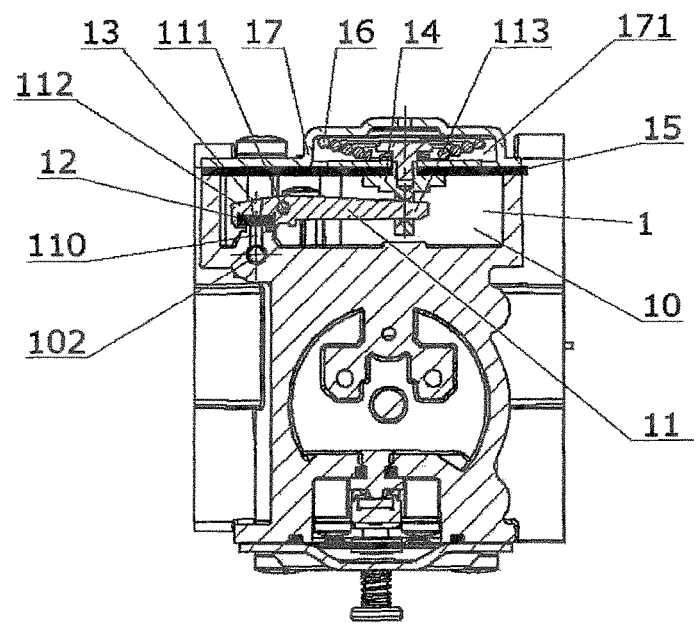
FIGS. 2 to 6 are sectional views of the carburetor according to the present invention.

With reference now to FIG. 2, the intake section 102 is connected via a first connecting conduit 110 to a first pressure reduction section 1. The first pressure reduction section 1 comprises a first chamber 10 defined by a recess formed directly in the main body 101 of the carburetor 100. For example, the chamber 10 may be made from an initial block by any machining process with stock removal.

The first chamber 10 is then sealed, on the side facing the outside of the main body 101, by a first deformable diaphragm 15 which therefore constitutes a sealing wall of the chamber. Preferably, the deformable diaphragm 15 is, in turn, covered by a first shell-like wall 17, which screens the deformable diaphragm 15 and the corresponding chamber 10 from the outside. According to a preferred embodiment, the shell-like wall is fixed to the main body by screws or similar threaded elements.

Additionally, again according to a preferred embodiment, a recess 171 is formed on the shell-like wall 17 to house a spring 16, preferably a conical spring, whose ends are, respectively, fixed to the shell-like wall 17 and to the diaphragm 15, so as to oppose the movements, and consequently the deformation, of the diaphragm.

Clearly, however, it is possible to use different resilient means 16 to oppose the deformation of the diaphragm 15.

The first pressure reduction section 1 further comprises a first shutter device 11 which is connected for operation to the first deformable diaphragm 15 and enables the connecting conduit 110 to be selectively closed. In other words, after the connecting conduit 110 has been opened by the shutter device 11, the diaphragm 15 is deformed while being opposed by the resilient means 16.

Thus, when a gas is supplied through the conduit 110 at a sufficient pressure to cause the opening of the shutter device 11, and therefore at a pressure such that the pressure acting on a sealing element 12 of the shutter device is sufficient to create a force greater than that of the resilient means, there will be a flow of gas into the chamber 10, while the diaphragm 15 will be simultaneously deformed, thereby reducing the available volume of the chamber 10.

This provides a pressure reduction of the gas introduced into the chamber 10, this reduction being dependent on the geometrical characteristics of the components of the pressure reduction section and on the pre-loading of the spring 16.

According to a preferred embodiment, the shutter device 11 is made in the form of a lever, preferably of the first class. The lever is pivoted on a pin 111 fixed to a base wall of the chamber 10, in such a way that an end 112, in which the sealing element 12 is housed, and an end 113 opposed thereto and connected to the diaphragm 15 by a connecting element 14 can oscillate in opposite directions about the axis of the lever, defined by the pin 111.

This solution has proved to be particularly suitable for the present invention, since it makes it possible to provide a reasonably compact solution which is particularly strong and reliable.

In particular, the arm at the end 112 supporting the seal 12 is lower than the arm at the opposite end 113, advantageously allowing a greater travel of the latter end and consequently a more effective deformation of the diaphragm 15.

Preferably, a through opening 13 is defined in the end 112 supporting the seal 12, such that the pressure in the first section 1 acts on one side of the seal 12. This allows to at least partially prevent the seal 12 to come out from a respective seat in the end 112.

Figure 3:
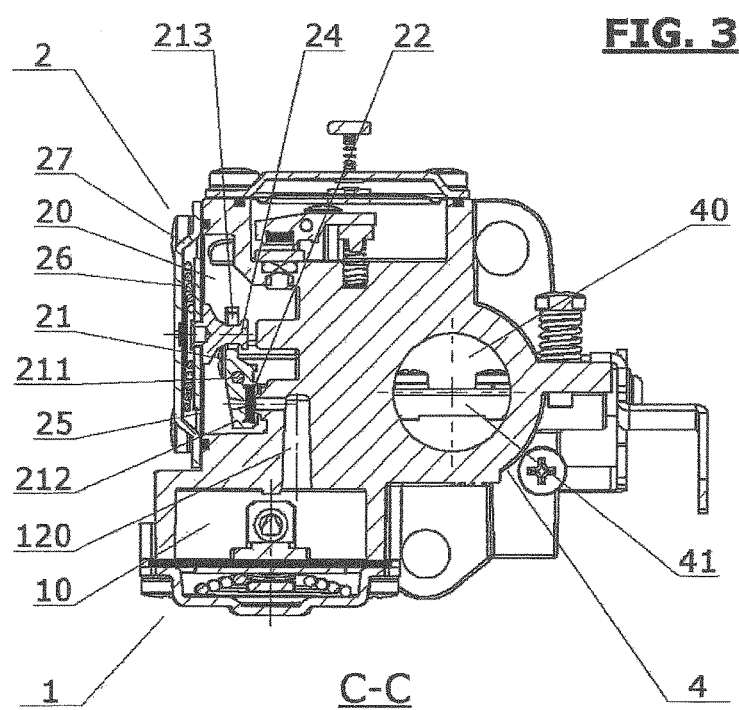

With reference now to FIG. 3, the first chamber 10 is connected via a second connecting conduit 120 to a second pressure reduction section, indicated as a whole by the reference number 2.

According to a preferred embodiment, the second pressure reduction section 2 has similar characteristics to those of the first section 1. Consequently, in the following text, components of the second section that are similar to those used in the first section 1 will, where appropriate, be given the same names as those used previously and will be identified by the adjective "second".

Thus the second section preferably comprises a second chamber 20 formed directly in the main body 101, a second deformable diaphragm 25 which forms a sealing wall of the second chamber 20, and a second shutter device 21 adapted to selectively close the second connecting conduit 120. The second shutter device 21 is therefore connected for operation to the second deformable diaphragm 25 in such a way that the opening of the second shutter device 21 causes the second diaphragm 25 to be deformed so as to reduce the volume formed by the second chamber 20. This movement is opposed by corresponding resilient means 26.

Preferably, in this case also, the shutter device 21 is made in the form of a lever, with similar characteristics to those described in relation to the first pressure reduction section. The lever is therefore pivoted on a pin 211 fixed to a base wall of the chamber 20, in such a way that an end 212, in which the sealing element 22 is housed, and an end 213 opposed thereto, and connected to the diaphragm 25 by a connecting element 24, can oscillate in opposite directions about the axis of the lever, defined by the pin 211.

Figure 4:
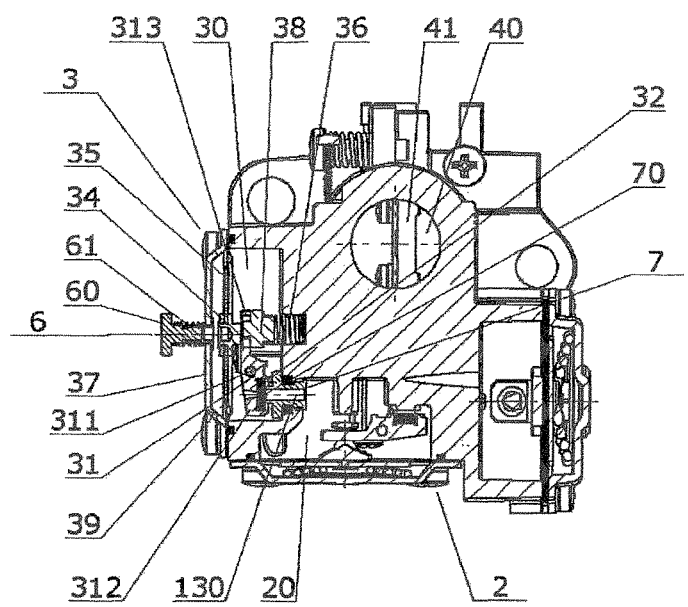

With reference now to FIG. 4, the carburetor according to the present invention further comprises a supply section 3 connected to the second pressure reduction section 2 by a connecting conduit 130, which puts the second chamber 20 into communication with a third chamber 30 of the supply section.

Advantageously, the third chamber 30 is also formed directly in the main body 101, in a similar way to the chambers forming the sections described above.

The supply section 3 further comprises a third deformable diaphragm 35 which forms a sealing wall of the third chamber 30. The connecting conduit 130 can be closed selectively by means of a third shutter device 31 which is connected for operation to the third deformable diaphragm 35 in such a way that the opening of the third shutter device 31 causes the deformable diaphragm 35 to be deformed so as to reduce the volume formed by the second chamber 30.

According to a preferred embodiment, the supply section 3 comprises resilient means 36, preferably made in the form of a helical spring extending between the third shutter device 31 and a base wall of the chamber 30 as will be better shown in the following.

More generally, the resilient means 36 are made in such a way that they oppose the deformation of the second deformable diaphragm 35.

According to the embodiment described above, the part of the diaphragm 35 facing towards the outside of the chamber 30 can be pushed by an actuating device 6, formed, in the present embodiment, by a pin 60, which is slidable within an opening formed in a shell-like wall 37 covering the deformable diaphragm 35. Preferably, the actuating device 6 further comprises a resilient element 61 adapted to push the pin outwards and to oppose the sliding of the pin towards the inside of the chamber 30. Furthermore, the shell-like wall 37 is also provided with a calibrated air returning hole 39, i.e. a hole with calibrated diameter, allowing the deformable diaphragm to operate without being impaired by depressions that might occur in the chamber since it provides air at atmospheric pressure to the deformable diaphragm.

The pin 60 therefore enables the diaphragm 35 to be pushed from the outside towards the inside of the chamber 30, where it acts on the shutter 31 in the direction of opening the conduit 130.

As described in greater detail below, the shutter 31 and the corresponding resilient means 36 are made and dimensioned in such a way that they are normally open when the engine in which the carburetor is used is started.

The actuating device 6 is mainly directed to make the start of the engine easier, since it is possible to force the shutter 31 in the open position by acting on the pin 60. This allows gas to flow into the chamber 30 even when the engine is turned off and enriching the air/fuel mixture during start.

However, it may be difficult to open the shutter because of the presence of dust or dirt in general in the chamber 30, which will impede the starting of the engine, but the shutter can be forced to open by means of the actuating button 6 so as to allow the passage of gas and promote the starting of the engine.

Always with reference to FIG. 4, it may be noted that, preferably, in the supply section 3 also, the shutter device 31 is made in the form of a lever, with similar characteristics to those described in relation to the first pressure reduction section. The lever is therefore pivoted on a pin 311 fixed to a base wall of the chamber 30, in such a way that an end 312, in which the sealing element 32 is housed, and an end 313 opposed thereto, and connected to the diaphragm 35 by a connecting element 34, can oscillate in opposite directions about the axis of the lever, defined by the pin 311.

As previously outlined, according to a preferred embodiment, the resilient means 36 extend between a metallic insert 38 abutting onto the end 313 of the shutter device 31 and the base wall of the chamber 30.

Preferably, the conduit 130 is associated with an adjustable nozzle 7, which is, for example, associated with the conduit by means of a threaded connection.

Thus the position of the outlet aperture 70 facing the chamber 30 can be adjusted so as to move it towards or away from the base wall of the chamber 30. Because of this characteristic, therefore, the closing position of the shutter 31 can be varied by modifying the load of the resilient means in the closed position. Thanks to the presence of the adjustable nozzle 7, it is possible to compensate possible inaccuracies of the base wall of the chamber 30 by varying the height of the nozzle 7 itself. This is particularly advantageous since the shutter with the respective elastic means require very strict tolerance in order to operate properly.

Figure 5:
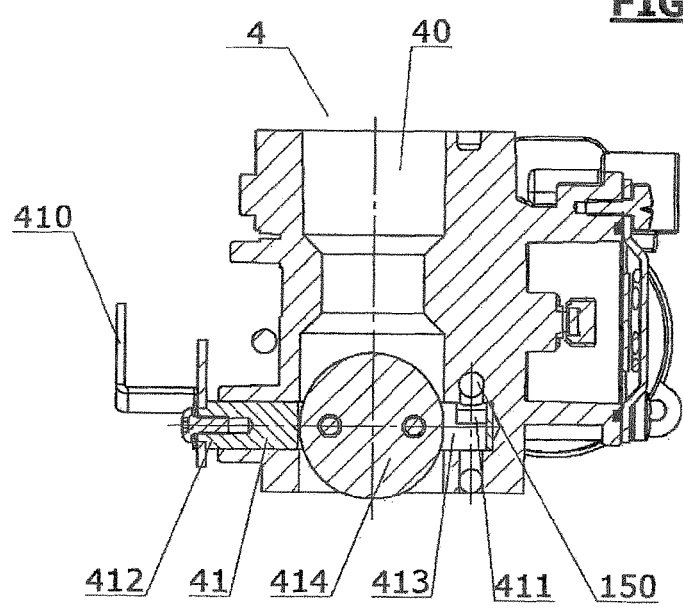

With reference now to FIG. 5, the carburetor according to the present invention further comprises a Venturi device 4 connected to the chamber 30 by means of a supply conduit 150.

The Venturi device 4 is essentially formed by a conduit 40 with a variable cross section, such that the variation in the cross section can be used to create a pressure difference capable of drawing a flow of gas from the supply conduit 150.

Air is therefore passed through the conduit and mixed with the gas supplied from the supply conduit 150, and the resulting mixture is sent to the engine.

The device 4 further comprises a butterfly member 41 for regulating both the air flow and the gas flow. More precisely, the butterfly member 41 adjusts the air flow by means of the butterfly disk 414, which is operated by an external lever system 410 connected to an upper end 412 of the butterfly member 41, i.e. the end directed outside the carburetor body, interfacing to an engine adjustment system, not shown in the Figures.

The gas flow is instead adjusted through a passage 411 defined at the lower end 413 of the butterfly member 41, (i.e. the end opposed to the one to which the lever system 410 is connected), intersecting the supply conduit 150.

Figure 6:
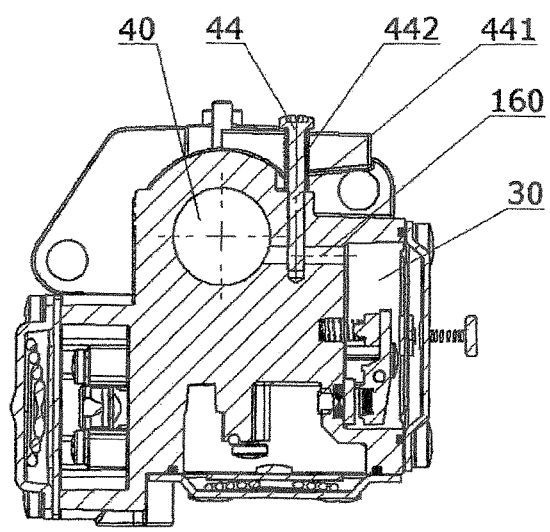

A further adjustment of the air/fuel ratio, according to a preferred embodiment, is obtained by the air/gas mixture adjusting device 44 shown in FIG. 6. The adjusting device 44 chokes a supply conduit 160 allowing the gas to flow from the chamber 30 to the conduit 40. Preferably, the adjusting device 44 comprises a screw 441 having appropriate diameter and length and an elastic member 442 adapted to push outwards the screw and avoid unintentional modification in the adjusting device that might be caused by the vibrations.

With reference to FIGS. 1A to 1E again, the arrangement of the aforesaid components is such that the Venturi device 4 forms a central portion of the carburetor 100.

The conduit of the Venturi device defines an axis of longitudinal extension x.

The arrangement of the other components with respect to the Venturi conduit 4 is such that the first pressure reduction section 1 and the supply section 3 extend on opposite sides of the axis of longitudinal extension x.

On the other hand, the second supply section 2 is interposed between the first pressure reduction section 1 and the supply section 3.

Additionally, according to a preferred embodiment, the main body 101 has five faces, each face being perpendicular to the faces adjacent to it, and therefore has an orientation similar to that of a parallelepiped. In this configuration, the chambers 10 and 30, respectively, of the first section 1 and of the supply section are formed on opposite faces, while the chamber 20 of the second section 2 is in the face adjacent to the aforesaid two faces.

The remaining two faces form an intake section and an outlet section of the Venturi conduit 40.

Alternative embodiments of the carburetor according to the present invention will be now described with reference to FIGS. 7 to 9. To this regard, it should be note that the following embodiments will be described only with reference to the features differentiating them from the previously described embodiment. Therefore, unless explicitly stated, the same feature of the previous embodiment also apply to the following ones.

Figure 7:
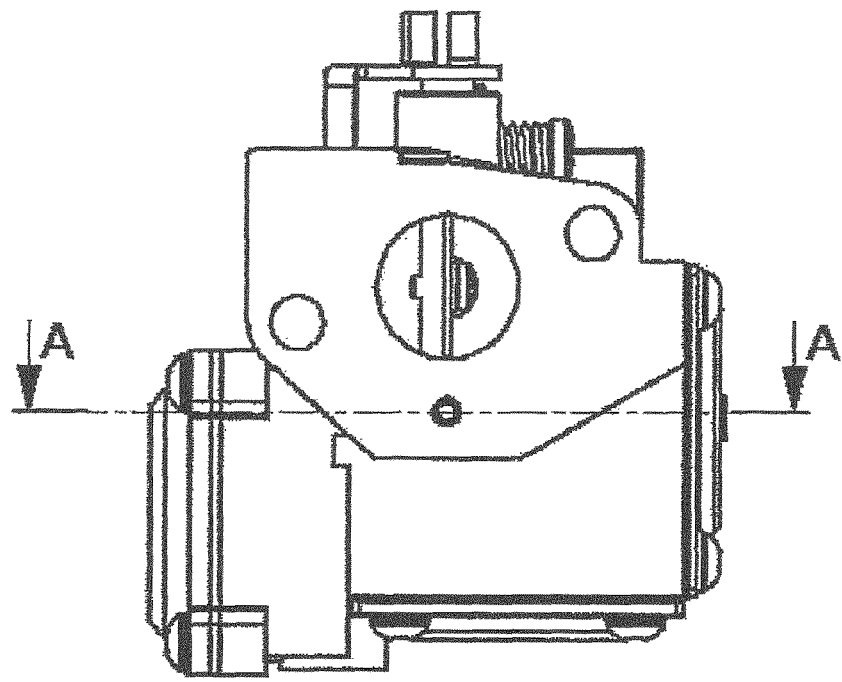
FIGS. 7-7A depict an alternate embodiment and sectional view, respectively, of a carburetor according to the present invention.
Figure 7A:
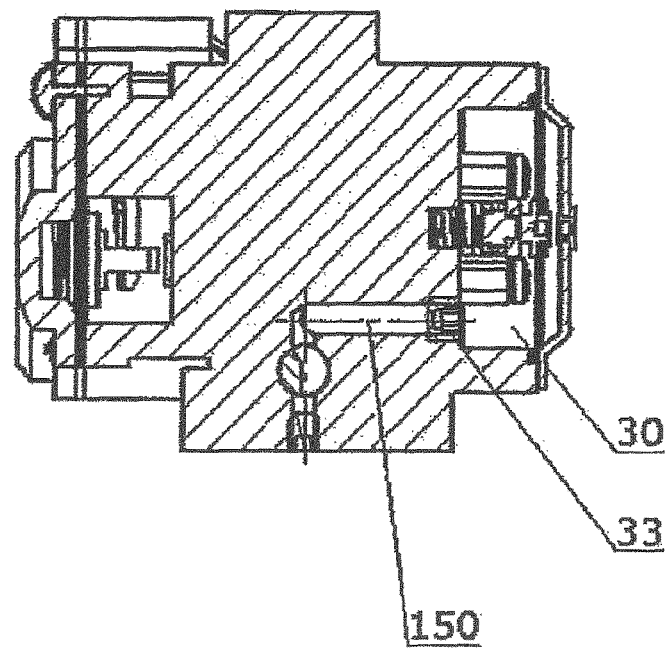

With reference to FIGS. 7 and 7A, according to an first alternative embodiment, an adjusting nozzle 33 can be provided within the chamber 30, at the inlet of the conduit 150 connecting the chamber 30 with the Venturi conduit 40. The adjusting nozzle 33 has a calibrated diameter, so that it is possible to adjust the amount of gas flown through the conduit 150.

Preferably, the adjusting nozzle 33 comprises a threaded body for connecting it to the conduit 150 having, to this end, a corresponding female thread.

Figure 8:
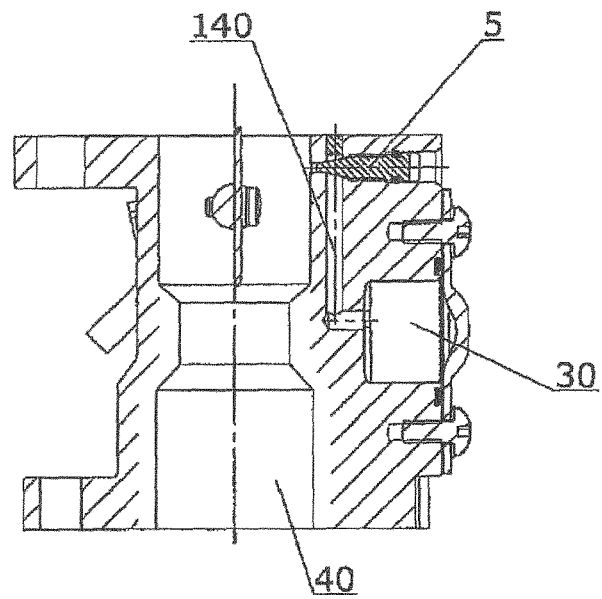
FIGS. 8-8A depict a second alternate embodiment and sectional view, respectively, of a carburetor according to the present invention.
Figure 8A:
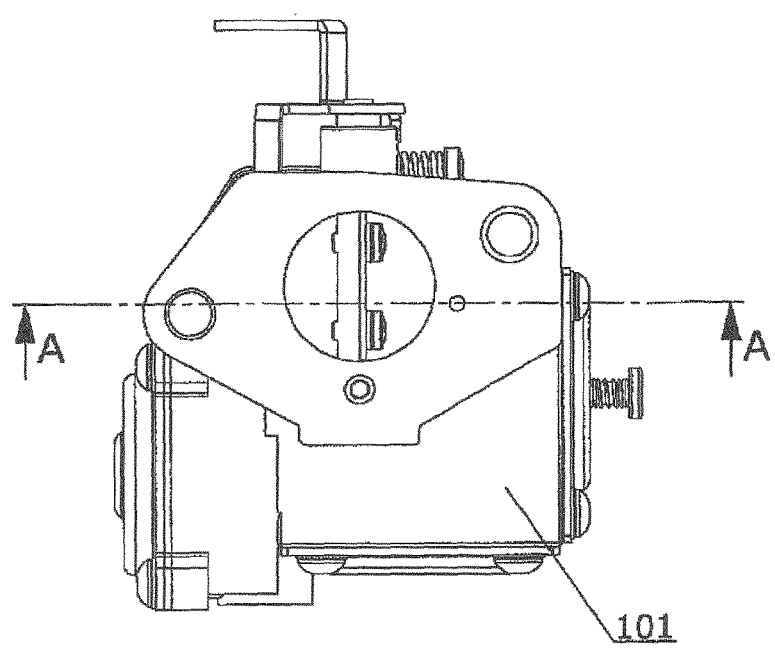

With reference to FIGS. 8 and 8A, according to a second alternative embodiment, a valve member 5 can be provided in the main body 101, allowing a further adjustment of the flow rate through the supply conduit 140 connecting the chamber 30 and the Venturi conduit 40.

Figure 9:
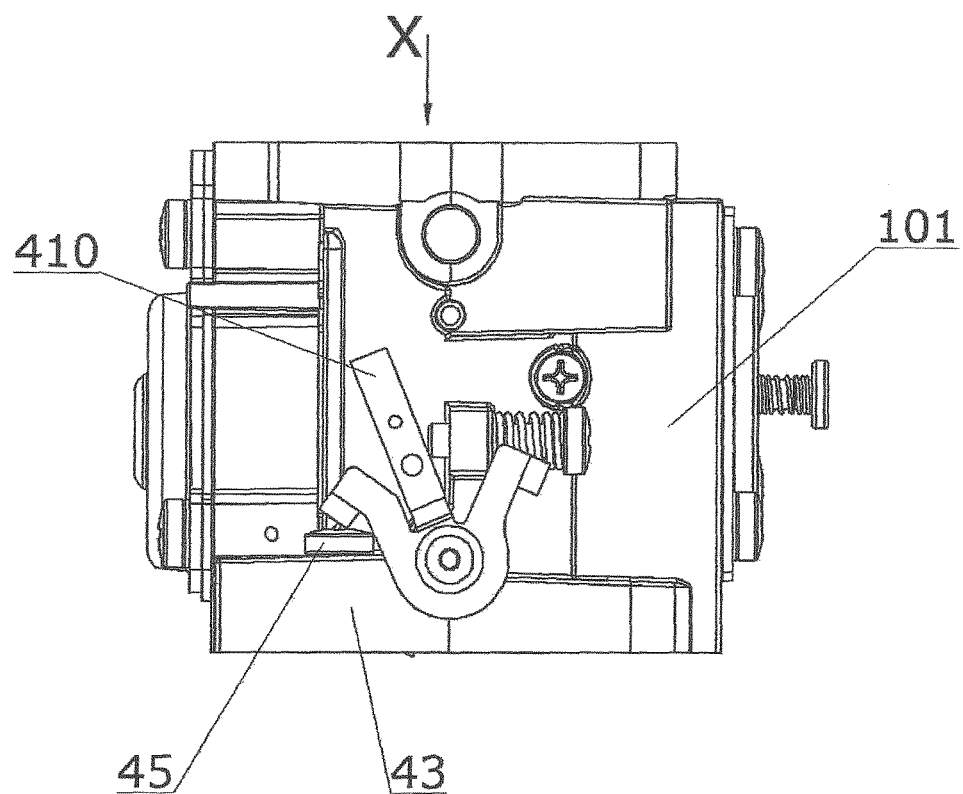
FIG. 9 depicts a threaded member on the main body of a carburetor according to the present invention.

Finally, with reference to FIG. 9, a threaded member 45, e.g. a screw, is provided on the main body 101 at a strike portion 43 of the lever system 410 corresponding to position of the lever system 410 in which the Venturi conduit 40 is fully open (i.e. the butterfly body 41 is parallel to the axis of longitudinal extension x).

In this manner, the threaded member 45 allows to further adjust the size of the section available for the passage of air in the conduit 40 and of gas in conduit 150.

Thus the invention resolves the problem which was proposed, while providing a number of advantages. In particular, because of the configuration described above, the main body can advantageously be produced from a single initial block, thereby providing a highly compact and functional carburetor.

Also, the particularly compact structure makes the carburetor highly adaptable, thus making it particularly suitable for the conversion of existing petrol engines.

Additionally, the correct functioning of the carburetor is ensured even in rather unfavorable operating conditions, such as dusty environments.

The invention claimed is:

1. A carburetor (100) for supplying gaseous fuels in internal combustion engines, comprising a main body (101) in which the following are defined:

a. an intake section (102) for the fluid fuel at high pressure;
  b. a first pressure reduction section (1) comprising a first chamber (10) formed directly in the main body (101), a first deformable diaphragm (15) forming a sealing wall of the first chamber (10), a first shutter device (11) for selectively closing a first connecting conduit (110) between the supply section and the first chamber (10), the first shutter device (11) being connected for operation to the first deformable diaphragm (15) in such a way that the opening of the first shutter device (11) causes the first deformable diaphragm (15) to be deformed so as to reduce the volume formed by the first chamber (10), and first resilient member (16) for opposing deformation of the first deformable diaphragm (15);

c. a second pressure reduction section (2) connected to the first section (1) and comprising a second chamber (20) formed directly in the main body (101), a second deformable diaphragm (25) forming a sealing wall of the second chamber (20), a second shutter device (21) for selectively closing a second connecting conduit (120) between the first chamber (10) and the second chamber (20), the second shutter device (21) being connected for operation to the second deformable diaphragm (25) in such a way that the opening of the second shutter device (21) causes the second deformable diaphragm (25) to be deformed so as to reduce the volume formed by the second chamber (20), and second resilient member (26) for opposing deformation of the second deformable diaphragm (25);

d. a supply section (3) connected to the second pressure reduction section (2) and comprising a third chamber (30) formed directly in the main body (101), a third deformable diaphragm (35) forming a sealing wall of the third chamber (30), a third shutter device (31) for selectively closing a third connecting conduit (130) between the second chamber (20) and the third chamber (30), the third shutter device (31) being connected for operation to the third deformable diaphragm (35) in such a way that the opening of the third shutter device (31) causes the third deformable diaphragm (35) to be deformed so as to reduce the volume formed by the third chamber (30), and third resilient member (36) for opposing deformation of the third deformable diaphragm (35);

e. a Venturi device (4) comprising a butterfly member (41) and connected to the supply section (3) so as to mix an air flow with gaseous fuel introduced through a supply conduit (150) connected to the third chamber (30), the resilient means (36) being made in such a way that the third shutter device (31) is normally in a closed position and is pushed into an open position as a result of the passage of the air flow through the Venturi device (4);

wherein the Venturi device (4) forms a central portion of the carburetor (100), the first pressure reduction section (1) and the supply section (3) extending on opposite sides of a longitudinal axis of extension (x) of the Venturi device (4), the second supply section (2) being interposed between the first pressure reduction section (1) and the supply section (3);

wherein the supply section further comprises an actuating device (6) that can be actuated from the outside of the third chamber (3) and can push the third shutter device (31) into the open position, allowing gas to pass through the third connecting conduit (130) towards the third chamber (30), the actuating device (6) comprising a pin (60) which is slidable within a through hole made in a third shell-like wall (37) fixed to the main body (101) so as to cover the third deformable diaphragm (35), and wherein the resilient member (16) of the first section (1) and/or the resilient member (26) of the second section (2) comprise a conical helical spring interposed between the deformable diaphragm (15, 25) and a shell-like wall (17, 27) fixed to the main body (101) so as to cover the deformable diaphragm (15, 25).

2. The carburetor (100) according to claim 1, wherein the first shutter device (11) and/or the second shutter device (21) and/or said third shutter device (31) comprise a lever pivoted on a pin (111, 211, 311) fixed to a base wall of the chamber (10, 20) in such a way that an end (112, 212, 313) in which the sealing element (12, 22, 32) is housed, and an end (113, 213, 313) opposed thereto and connected to the diaphragm (15, 25, 35) by a connecting element (14, 24, 34) can oscillate in opposite directions about the axis of the lever.

3. The carburetor (100) according to claim 1, wherein one of the resilient member (36) of the supply section (3) comprises a helical spring extending between the shutter device (31) a base wall of the third chamber (30).

4. The carburetor (100) according to claim 1, further comprising a resilient element (61) adapted to push the pin (60) outwards and to oppose the sliding of the pin (60) towards the inside of the third chamber (30).

5. The carburetor (100) according to claim 1, wherein said third shell-like wall (37) comprises an air return hole (39) providing air at atmospheric pressure to said third deformable diaphragm (35).

6. The carburetor (100) according to claim 1, wherein the main body (101) has five faces, each face being perpendicular to the faces adjacent to it, wherein the first chamber (10) and the third chamber (30) are formed on two opposed faces, the second chamber (20) being formed in the face adjacent to the aforesaid two opposed faces.

7. The carburetor (100) according to claim 1, wherein the third connecting conduit (130) is associated with an adjustable nozzle (7) adapted to move an outlet aperture (70) of the nozzle towards and/or away from the chamber (30).

* * * * *